Aug. 7, 1945.  A. L. LEE  2,381,672
SHUTTLE CAR
Filed Nov. 28, 1944   2 Sheets-Sheet 1
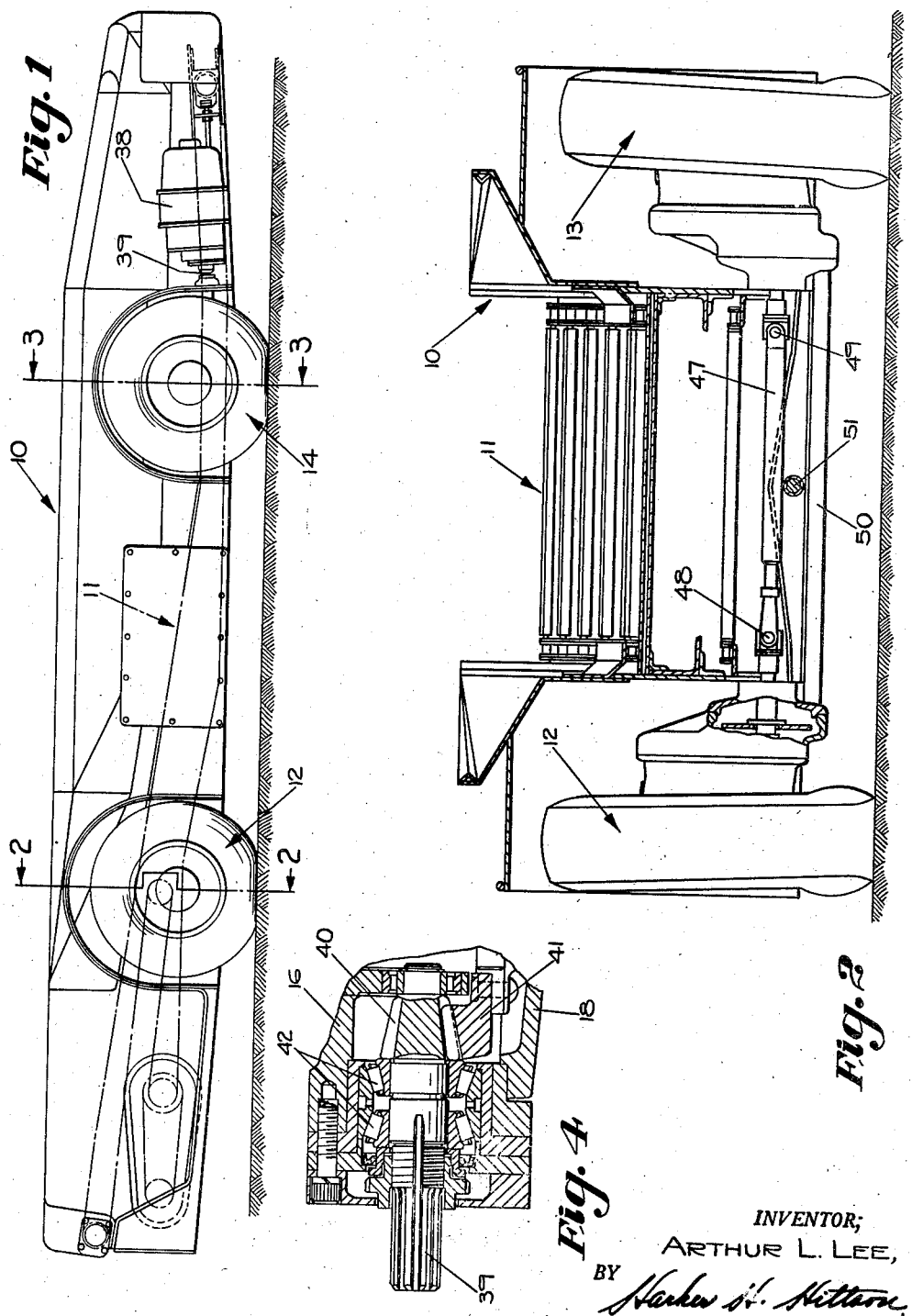
INVENTOR;
ARTHUR L. LEE,
BY
ATT'Y.

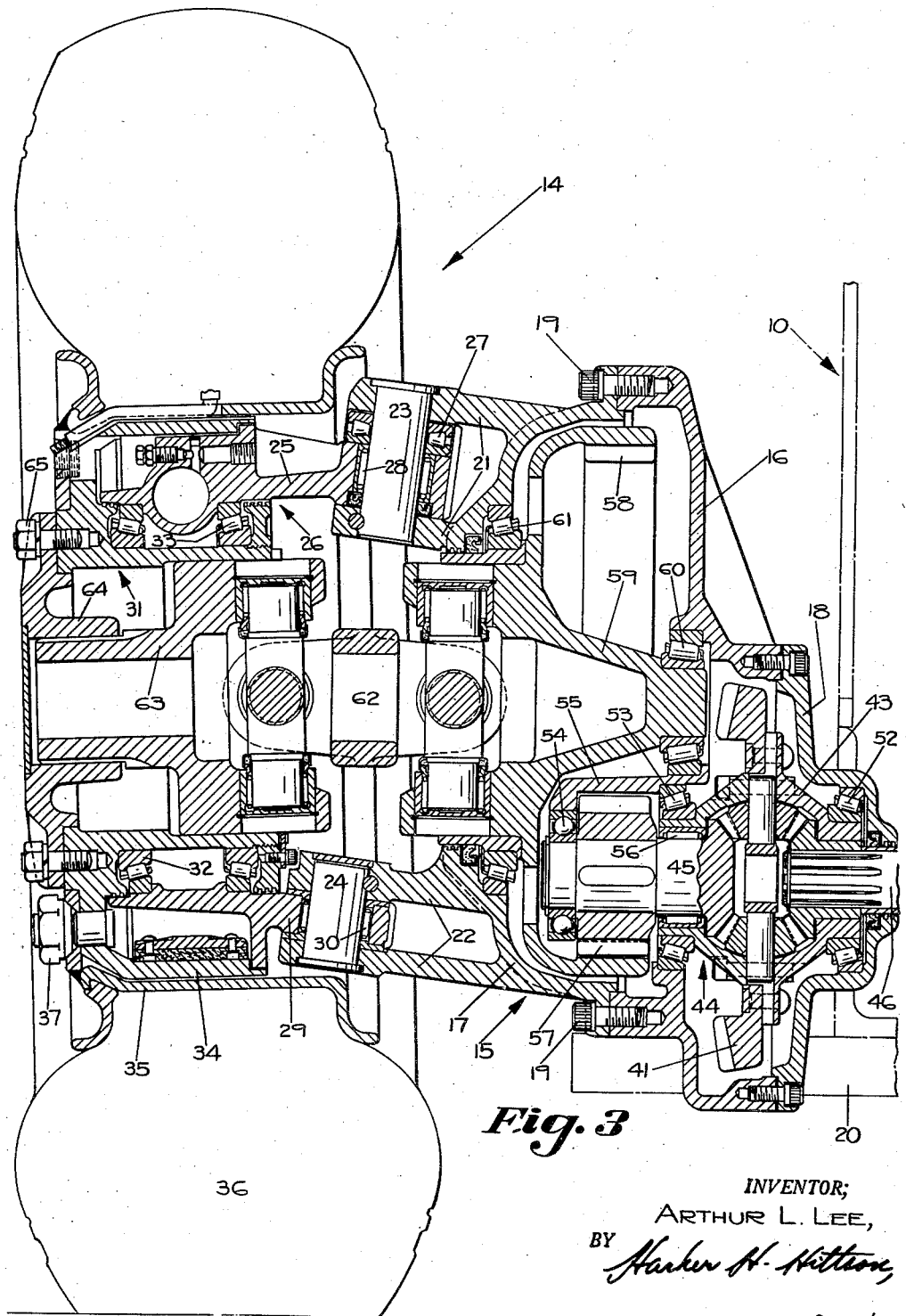

Patented Aug. 7, 1945

2,381,672

UNITED STATES PATENT OFFICE 2,381,672

SHUTTLE CAR

Arthur L. Lee, Upper Arlington, Ohio, assignor to The Jeffrey Manufacturing Company, a corporation of Ohio Application November 28, 1944, Serial No. 565,555

6 Claims. (Cl. 180—43)

This invention relates to a shuttle car and to a wheel assembly particularly adapted for use in shuttle cars, but which may also have other uses.

An object of the invention is to provide an improved shuttle car with a simplified driving and steering wheel arrangement.

Another object of the invention is to provide an improved power driven steering wheel mechanism.

Other objects of the invention will appear hereinafter, the novel features and combinations being set forth in the appended claims.

In the accompanying drawings,

Fig. 1 is a side elevational view of a shuttle car incorporating the features of my invention;

Fig. 2 is a transverse sectional view taken on the line 2—2 of Fig. 1, looking in the direction of the arrows, with certain parts omitted;

Fig. 3 is a sectional elevational view of one of the wheel assemblies of the shuttle car, taken on the line 3—3 of Fig. 1, looking in the direction of the arrows; and Fig. 4 is a sectional plan view of a portion of the drive mechanism.

The invention herein disclosed involves particularly a modified form of drive gearing for the four power driven steering wheels of a shuttle car, as compared with that disclosed in my application, Serial No. 518,810, filed January 18, 1944, for a Shuttle car. As a consequence, it is to be understood that unless a contrary fact is indicated, the shuttle car herein disclosed follows that of my said application.

Briefly described, the shuttle car comprises a main frame or body 10 which is adapted to receive material, such as coal, to be transported by the shuttle car as from a loading machine to a mine car or entry belt. Running along the bottom of the body 10 is a conveyor 11 by which the coal is discharged from said body 10 as aforesaid.

The shuttle car or vehicle is provided with four power driven steering wheel assemblies. There is a pair of said wheel assemblies adjacent each end, the pair adjacent the rear end being seen in Fig. 2 of the drawings and being designated 12 and 13, respectively. One of the wheel assemblies adjacent the forward end is seen in Figs. 1 and 3 of the drawings and is designated 14. The structures of the four wheel assemblies 12, 13 and 14 and the wheel assembly which is paired with assembly 14, follow the structure disclosed in Fig. 3 of the drawings, except for certain differences hereinafter pointed out.

Referring to Fig. 3 of the drawings, the wheel assembly 14 includes a stationary or frame bracket 15 which forms a differential and reduction gear housing, the principal parts of which are housing or casing castings 16 and 17 and a removable cap 18 which is removably connected to the casting 16. Housing castings 16 and 17 are removably connected by a plurality of screws 19. The stationary bracket 15 is mounted on a transverse bar 20, which forms a part of the main frame 10, by bolts or screws not shown.

Formed as an integral part of the casting 17 is a bifurcated upper pivot arm 21 and a bifurcated lower pivot arm 22. Pivot arm 21 is provided with pivot pin 23, and pivot arm 22 is provided with pivot pin 24, these two pivot pins 23 and 24 having a common upwardly extending axis which preferably slopes outwardly and downwardly and provides the pivotal steering axis of the wheel assembly 14.

Mounted between the upper and lower members of upper pivot arm 21 is the upper arm 25 of a wheel bracket 26, there preferably being an anti-friction thrust bearing 27 between the upper portion of the bracket 25 and the bottom face of the upper portion of upper pivot arm 21 to take the thrust transmitted from the wheel bracket 26 to the frame bracket 15.

A needle roller bearing 28 also is preferably provided between pin 23 and arm 25. At its lower portion the wheel bracket 26 is provided with a lower arm 29 which is pivotally connected to the pin 24 by a needle bearing 30.

Mounted upon the wheel bracket 26 for rotation in a substantially upright plane is a wheel 31, the mounting thereof being by a pair of spaced roller bearings 32 and 33. The wheel 31 includes an integral brake drum and rim supporting portion 34 upon which a removable rim 35 carrying a pneumatic tire 36 is removably mounted by lugs 37.

As illustrated in Fig. 2 of the drawings, the pair of wheels adjacent each end of the vehicle is driven from a common motor individual to that pair. For example, wheels 12 and 13 are driven from one motor and wheel 14 and its associated wheel are driven from another motor. For example, an electric motor 38 (see Fig. 1) drives the wheel 14 and the associated wheel on the opposite side of the vehicle which are at the forward end thereof. A similar motor on the opposite side of the vehicle drives the two rear wheels 12 and 13.

The motor 38 is coupled to drive a shaft 39 (see Fig. 4) which has a beveled gear 40 on the inner end thereof, meshing with a beveled ring gear 41, both of said gears being contained within the housing provided by the bracket 15. The shaft 39 is mounted in a pair of spaced roller bearings 42, as clearly illustrated in Fig. 4 of the drawings.

The ring gear 41 is connected to the housing or shell 43 of a differential 44 which drives a pair of shafts 45 and 46 through differential action in a well known manner. Shaft 46 is connected to a cross shaft similar to the cross shaft 47 seen in Fig. 2 of the drawings and drives the companion wheel assembly to wheel assembly 14. In a like manner a single motor at the rear end of the vehicle drives the companion wheels 12 and 13 through the shaft 47, there being a universal joint provided in the wheel assembly 13 and a straight axle drive in the wheel assembly 12, as illustrated in Fig. 2 of the drawings. In other words, there is a single motor and differential for the pair of wheels 12 and 13, and a single motor and differential for the pair of wheels 14 and its companion.

The cross shaft 47 is preferably provided with universal joints 48 and 49 and provides for the free removal of the wheel assemblies 12 and 13, as disclosed in my application above identified, by the simple expedient of unbolting the frame or stationary brackets from a frame member or pivoted axle 50 which is pivotally mounted on a longitudinal horizontal pivot pin 51. The frame member 20 at the front of the vehicle is preferably rigidly attached to the main frame 10.

The differential housing 43 is mounted in the casing or bracket 15 on a pair of spaced roller bearings 52 and 53, and the shaft 45 is mounted at its outer end on a ball-bearing 54 carried on a bracket 55 formed as an integral part of the casting 16. At its inner end the shaft 45 is mounted on a needle bearing 56. Shaft 45 has a pinion gear 57 keyed thereto which meshes with and drives a large gear 58 which is preferably of the internally toothed type. This provides a reduction drive between the gears 57 and 58 which is a maximum for any given axial displacement of the axes of shaft 45 and gear 58. It is to be noted that the axis of shaft 45 is below that of gear 58, and pinion 57 is in mesh with the gear 58 at its lowest point.

The gearing between shaft 45 and gear 58 is not only to provide a reduction but also to provide for location of the axis of shaft 45 as low as possible, since the axis of gear 58 is substantially along the axis of rotation of wheel 31. This makes possible the positioning of the cross shaft similar to cross shaft 47 in a relatively low position in the frame 10 which is very desirable in the interest of maintaining the capacity of the carrier body or frame 10 at a maximum.

The gear 58 is provided with a hub 59 which is journaled in spaced bearings 60 and 61 carried by the bracket 15. At its left-hand end, as viewed in Fig. 3, the hub 59 of gear 58 is connected to a double universal joint 62, the center of which is intersected by the steering axis of the wheel assembly 14 which is the axis of the pivot pins 23 and 24. At its left-hand end the double universal joint 62 is connected with a driving member 63 which has a splined connection with a removable hub 64 of the wheel 31, said hub 64 being connected to said wheel 31 by studs and bolts 65 and in fact forming a part of said wheel 31.

It is thus to be seen that I have produced a vehicle in which all four wheels are driven and are steerable, the wheels at one end being driven by one motor through a common differential, and the wheels at the other end being driven by another motor through a common differential. The driving connection is through a double universal joint which provides for uniform torque and uniform instantaneous speed on the individual wheels, regardless of their steering angles, for uniform speed on the motor drive shaft.

By placing the differential 44 outside the main frame as is the complete wheel assembly, such as wheel assembly 14, the carrying capacity of the shuttle car body is maintained at a maximum. The low position of the transverse connecting shaft between two wheel assemblies of a pair, such as the shaft 47 which connects wheel assemblies 12 and 13, also contributes to a high capacity of the shuttle car without increasing its overall height which is always a limiting factor, since these shuttle cars are designed to operate in coal mine rooms which, in many instances, have a very restricted height.

The drive mechanism between the differential and the wheel proper is of very simple and rugged construction, involving only one speed reduction produced by the different sizes of the gears 57 and 58. The physical arrangement of these gears 57 and 58 with the axis of the former below that of the latter and with the gear 57 meshing with the gear 58 at its lowest position, also contributes to the desirable location of the cross shaft 47 or its equivalent.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A vehicle including a frame, a pair of power driven steerable wheel assemblies at one end of said frame, one on each side thereof, each including a traction wheel, a driving motor for driving both of said wheels, drive shaft means extending transversely of said frame and interconnecting drive gearing to both of said wheels, said drive gearing including a differential in one of said assemblies located outside said main frame, each of said steerable wheel assemblies also including a frame bracket attached to said main frame and a pivotally attached wheel bracket mounted on said frame bracket for steering movement about a steering axis, the drive gearing for each wheel including a large internally toothed gear mounted on a horizontal axis in said frame bracket, universal joint means connecting said gear and said wheel, and a pinion gear driving said large gear, the axis of said drive shaft being located below the axes of said large gears.

2. A vehicle including a frame, a pair of power driven steerable wheel assemblies at one end of said frame, one on each side thereof, each including a traction wheel, a driving motor for driving both of said wheels, drive shaft means extending transversely of said frame and interconnecting drive gearing to both of said wheels, said drive gearing including a differential in one of said assemblies located outside said main frame, each of said steerable wheel assemblies also including a frame bracket attached to said main frame and a pivotally attached wheel bracket mounted on said frame bracket for steering movement about a steering axis, the drive gearing for each wheel including a large gear mounted on a horizontal axis in said frame bracket, universal joint means connecting said gear and said wheel, and a pinion gear driving said large gear, the axis of said drive shaft being located below the axes of said large gears.

3. A power driven steerable wheel assembly including a frame bracket and housing adapted to be attached to a vehicle frame, a large internally toothed gear mounted on a horizontal axis in said frame bracket and housed thereby, a wheel bracket pivotally mounted on said frame bracket for pivotal movement on an upwardly extending axis, a wheel on said wheel bracket, universal joint means interconnecting said large gear and said wheel, a pinion gear mounted in said frame bracket on a horizontal axis below said first named horizontal axis and meshing with said large gear at its lowest point, and a differential mounted in said frame bracket housing and connected to said pinion.

4. A power driven steerable wheel assembly including a frame bracket and housing adapted to be attached to a vehicle frame, a large gear mounted on a horizontal axis in said frame bracket and housed thereby, a wheel bracket pivotally mounted on said frame bracket for pivotal movement on an upwardly extending axis, a wheel on said wheel bracket, universal joint means interconnecting said large gear and said wheel, a pinion gear mounted in said frame bracket on a horizontal axis below said first named horizontal axis and meshing with said large gear at its lowest point, and a differential mounted in said frame bracket housing and connected to said pinion.

5. A power driven steerable wheel assembly including a frame bracket and housing adapted to be attached to a vehicle frame, a large gear mounted on a horizontal axis in said frame bracket and housed thereby, a wheel bracket pivotally mounted on said frame bracket for pivotal movement on an upwardly extending axis, a wheel on said wheel bracket, universal joint means interconnecting said large gear and said wheel, and a pinion gear mounted in said frame bracket on a horizontal axis below said first named horizontal axis and meshing with said large gear at its lowest point.

6. A power driven steerable wheel assembly including a frame bracket and housing adapted to be attached to a vehicle frame, a large internally toothed gear mounted on a horizontal axis in said frame bracket and housed thereby, a wheel bracket pivotally mounted on said frame bracket for pivotal movement on an upwardly extending axis, a wheel on said wheel bracket, universal joint means interconnecting said large gear and said wheel, and a pinion gear mounted in said frame bracket on a horizontal axis below said first named horizontal axis and meshing with said large gear at its lowest point.

ARTHUR L. LEE.